May 8, 1962 G. SMITH ET AL 3,034,036
POSITION MEASURING APPARATUS
Filed Oct. 10, 1957
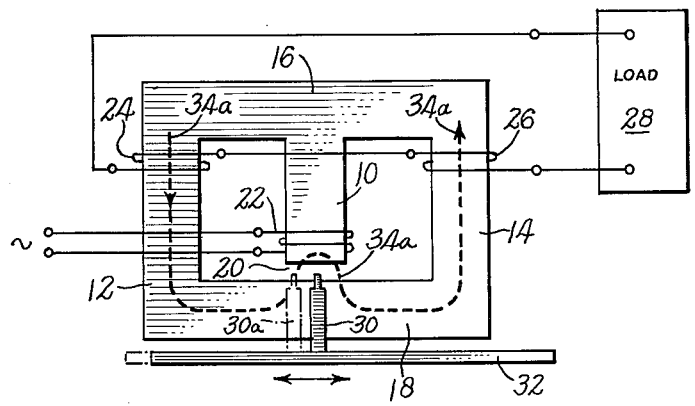
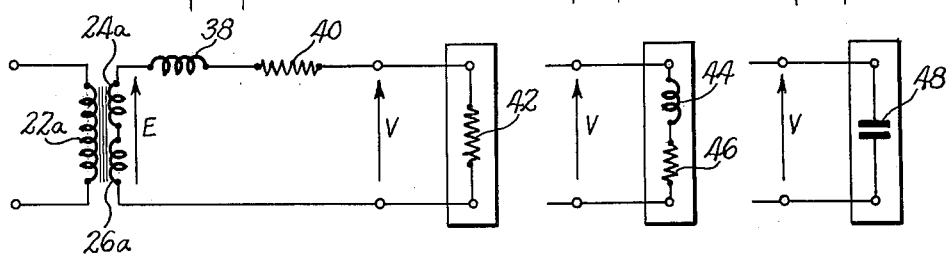
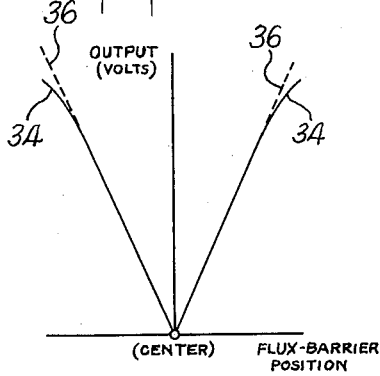
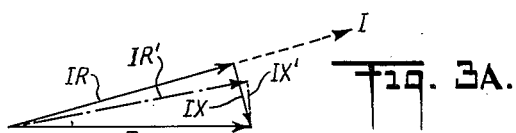
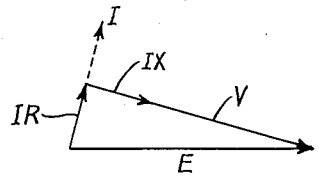
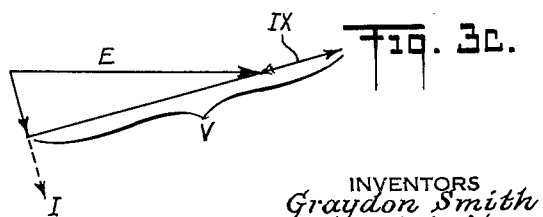
INVENTORS
Graydon Smith
John E. Bailey
BY
Curtis, Morris & Safford
ATTORNEYS United States Patent Office 3,034,036
Patented May 8, 1962

3,034,036
POSITION MEASURING APPARATUS
Graydon Smith, Concord, and John E. Bailey, Needham, Mass., assignors, by mesne assignments, to Clevite Corporation
Filed Oct. 10, 1957, Ser. No. 689,436
1 Claim. (Cl. 323—51)

This invention relates to position measuring apparatus. More particularly, this invention relates to improvements in apparatus adapted to produce an electrical output signal the magnitude of which varies in accordance with changes in the positioning of a movable input element. Devices of the general type with which the present invention is concerned are shown in U.S. Patents Nos. 2,207,248 and 2,631,272.

Such devices typically comprise a three-legged core formed of ferromagnetic material, with the central leg interrupted to form an air-gap within which a "flux-barrier" is arranged to move. Alternating-current flux is produced by a primary winding surrounding the central leg, and the flux-barrier controls the relative distribution of this flux between the two outer legs. A pair of secondary windings mounted respectively on these two outer legs develop signals in accordance with the amount of flux passing therethrough. The secondary windings ordinarily are connecter in series-opposition so that, when the flux-barrier is positioned in the center of the air-gap and the flux produced by the primary winding is essentially evenly dividend between the two outer legs, the individual secondary voltages will cancel to produce a "null" or zero output. As the flux-barrier is moved away from this position, the flux passing through one of the secondary windings is increased while the flux passing through the other secondary winding is decreased, with the result that a finite net voltage is produced by the two secondary windings together.

The magnitude of this net secondary voltage is very nearly linearly related to the positioning of the flux-barrier, particularly when the flux-barrier is in the central region of the air-gap where the flux density is quite uniform. Indeed, for many measurement applications, devices of this general character as provided heretofore have been considered to be essentially linear in operation. However, it is a fact that the output voltage of such prior devices does not change precisely linearly with changes in the flux-barrier position, particularly when the flux-barrier is near either of the ends of the air-gap. It now appears that this non-linear effect is due at least in part to non-uniform flux distribution near the ends of the air-gap, which causes the relationship between the induced secondary voltage and flux-barrier position to deviate from the desired strict linearity.

It has been found that these non-linear characteristics can readily be avoided in accordance with the present invention by constructing the device in such a manner that it has certain predetermined internal electrical characteristics as described and defined hereinbelow in more detail. In particular, precise linearity is obtained by arranging the device to have an internal leakage inductance of such magnitude that, as the flux-barrier is shifted across the air-gap, the resultant changes in leakage-inductance voltage drop exactly compensates for the deviations from a linear relationship between the induced secondary voltage and the positioning of the flux-barrier. As a result, the net output voltage produced by devices constructed in accordance with this invention is linearly related to the positioning of the flux-barrier throughout the full range of movement thereof.

Accordingly, it is an object of this invention to provide a position measuring device adapted to produce an output voltage the magnitude of which varies precisely linearly with changes in the positioning of an input member. It is a further object of this invention to provide such a device which is simple in design and inexpensive to manufacture. Other objects, advantages and aspects of the present invention will be in part apparent from, and in part pointed out in, the following description considered together with the accompanying drawings, in which:

FIGURE 1 is a diagrammatic view of a device constructed in accordance with the present invention;

FIGURES 2a, 2b and 2c are "equivalent" circuit diagrams representative of the internal electrical circuitry of the device of FIGURE 1 shown connected to various types of electrical loads;

FIGURES 3a, 3b and 3c are vector diagrams representing the voltage and current relationships in the circuit diagrams of FIGURES 2a, 2b and 2c respectively; and FIGURE 4 is a graph showing the variation of output voltage with changes in positioning of the flux-barrier.

Referring now to FIGURE 1, the device shown there comprises a magnetic core having a central leg 10 and a pair of outer legs 12 and 14 joined by a top portion 16 and a base portion 18. The central leg is interrupted at its lower end to form an air-gap 20 between that leg and the base portion. Surrounding the central leg is a primary winding 22 adapted to be energized from a source of alternating current, e.g. having a frequency of 1000 cycles per second.

The alternating flux produced by the primary winding 22 crosses the air-gap 20 and passes through the outer legs 12 and 14. Surrounding these outer legs are respective secondary windings 24 and 26 which are connected together in series-opposition and to a load generally indicated at 28.

Positioned within the air-gap 20 is a flux-barrier 30 comprising a closed ring of conductive material surrounding the base portion 18 of the magnetic core. This flux-barrier is mounted on a slide 32 for lateral movement between the remote ends of the air-gap. This slide is adapted to be coupled to any apparatus (not shown) the positioning of which it is desired to measure with the device shown herein.

When the flux-barrier 30 is in the center of the air-gap 20, the flux developed by the primary winding 22 is essentially evenly divided between the outer legs 12 and 14 so that the net output voltage produced by the secondary windings 24 and 26 and fed to the load 28 will effectively be zero. As the flux-barrier is moved away from this center position, e.g. to the position shown in dotted outline at 30a, more flux will pass through one of the outer legs 14 (because the reluctance of the air-gap in series with the magnetic path through that leg will be decreased) while less flux will pass through the other outer leg 12. Consequently, the voltage developed in one of the secondary windings 26 will be greater than the voltage developed in the other secondary winding 24, with the result that a finite net voltage will be fed to the load 28 by the two secondary windings together. The amplitude of this voltage is, of course, determined by the extent of movement of the flux-barrier away from its central position, and the phase of this voltage is determined by the direction of such movement.

As explained above, the relationship between the output voltage fed to the load 28 and the positioning of the flux-barrier 30 has, in devices of this general character provided heretofore, not been precisely linear. This is shown in FIGURE 4, where the solid lines 34 indicate the variation of output voltage with positioning of the flux-barrier. It will particularly be noted that the remote ends of these lines 34 "droop" away from the perfectly linear relation represented by the dashed lines 36. The magnitude of this droop is exaggerated in FIGURE 4 for purposes of clarity, but the deviations from linearity in such devices provided heretofore is nevertheless readily measurable, e.g. of the order of 0.0017 volt for a full-scale output voltage of 0.5765 volt.

The drooping characteristic of lines 34 in FIGURE 4 results primarily from the fact that the differential change in induced voltage in the secondary windings 24 and 26, for a given lateral displacement of the flux-barrier 30, decreases as the flux-barrier is located closer to the ends of the air-gap 20. In accordance with one aspect of the present invention, such a non-linear characteristic is compensated for by changes in the leakage-inductance voltage drop within the secondary winding circuit of the device of FIGURE 1, as will be explained with reference now also to FIGURE 2a.

FIGURE 2a represents an "equivalent" electrical circuit of the FIGURE 1 device, wherein the primary winding 22a and the secondary windings 24a and 26a are considered to form an "ideal" transformer (as in a conventional equivalent circuit for a transformer). The secondary windings are connected through an inductor 38 (representing the leakage inductance of the secondary windings) and a resistor 40 (representing the ohmic resistance of the secondary windings) to a load resistor 42. In this equivalent circuit, the induced secondary winding voltage is represented by an arrow E across the secondary windings 24a and 26a. It is this induced voltage E which, in the device shown in FIGURE 1, varies non-linearly with changes in the positioning of the flux-barrier 30.

FIGURE 3a is a vectorial representation of the voltage drops and current in the secondary circuit of FIGURE 2a. The induced secondary voltage is represented by a horizontal vector E. (It will, of course, be understood from the above discussion that the magnitude of the voltage E depends upon the positioning of the flux-barrier 30.) The alternating current flowing through the load resistor 42 is represented by the dotted line vector I, and the resistive voltage drop is represented by the vector IR; ordinarily, the secondary winding resistance 40 will be much smaller than the load resistance 42, so that the vector IR is substantially equal to the voltage V across the load. The voltage drop produced by the leakage inductance 38 is represented by the vector IX at right angles to the resistive voltage drop vector IR.

It has been found that the leakage inductance 38 is, in a device as shown in FIGURE 1, a variable quantity dependent upon the positioning of the flux-barrier 30. This can be demonstrated by considering the leakage flux path shown in FIGURE 1 by a dotted line 34a. This leakage flux path passes from the left-hand outer leg 12 across the air-gap 20 (to the left of the flux-barrier 30), recrosses the air-gap (to the right of the flux-barrier) and extends up through the right-hand outer leg 14 to return along the top member 16 back to the left-hand leg. When the flux-barrier 30 is positioned in the center of the air-gap (as shown in solid lines), the magnetic reluctance of this path is at a minimum and consequently the leakage flux and leakage inductance are at their maximum values. However, when the flux-barrier is moved away from its center position, e.g. to the left as shown in dotted outline 30a, the reluctance of that portion of the leakage flux-path to the left of the barrier will be increased while the reluctance to the right of the barrier will be decreased. Furthermore, the increase in reluctance on the left side will be greater than the corresponding decrease in reluctance on the right side. Consequently, there will be a net increase in reluctance for the leakage flux path and a corresponding net decrease in leakage flux and leakage inductance.

Accordingly, shifting the flux-barrier 30 towards either of the ends of the air-gap 20 will decrease the impedance represented by the leakage inductance 38. Since the load impedance remains constant, it will be apparent that such a shift in the barrier position will increase the proportion of the induced voltage E that appears across the load. This is demonstrated in FIGURE 3a wherein the dotted line vector IX' represents (in exaggerated scale) the decreased leakage inductance voltage drop due to a shift of the flux-barrier towards one end of the air-gap. With a smaller voltage drop across the leakage inductance, the proportion of the induced voltage E appearing across the load resistor 42 will increase, as represented by the dotted line vector IR'.

By properly constructing the magnetic elements of the device shown in FIGURE 1, the leakage inductance 38 can be fixed at a level such that the deviations from linearity between the induced voltage E and the positioning of the flux-barrier 30 can be compensated for exactly by the variations in proportionate voltage drop across the leakage inductance as the flux-barrier is moved across the air-gap. With such an arrangement, the output voltage appearing across the load resistor 42 will follow the straight dotted lines 36 (FIGURE 4) rather than the drooping solid lines 34.

There are, of course many factors involved in controlling the value of leakage inductance in a device of the type shown in FIGURE 1, and no precise formula can be given that will under all circumstances indicate the most suitable configuration of the magnetic core and the windings thereon. These factors are, however, well understood by those skilled in the art so that, if a prototype model of such a device exhibits the characteristics of the drooping line 34 of FIGURE 4, it will readily be apparent from the discussion hereinabove how the design should be rearranged to accomplish the desired objective of linear output throughout the full range of flux-barrier movement. For example, one way to increase the effectiveness of the leakage inductance drop in counteracting a non-linear output droop is to shorten the length of the air-gap 20, e.g. by increasing the length of the central leg 10, which has the effect of increasing the leakage inductance and, more importantly, increasing the differential change in leakage-inductance voltage drop for a given lateral displacement of the flux-barrier. The leakage inductance also may be increased by increasing the depth or width of the air-gap, e.g. by increasing the core thickness or by widening the central leg 10. There are, of course, other well known ways to control the leakage inductance of a structure such as shown in FIGURE 1, and the determination of the method or combination of methods used will depend upon the particular application involved.

It may be noted that the change in leakage inductance for a given lateral displacement of the flux-barrier 30 is greatest when the flux-barrier is nearest the ends of the air-gap 20. This characteristic is especially advantageous because the deviation from linearity between the induced voltage E and the flux-barrier position also is greatest in these regions. It has been found possible, because of this, to obtain an effectively perfect compensation so as to produce an output voltage across the load that varies precisely linearly with respect to changes in the flux-barrier positioning.

The effectiveness of the leakage inductance in controlling linearity can be augmented by using a reactive load. For example, FIGURE 2b shows a load comprising an inductance 44 in series with a resistor 46 (which may be the ohmic resistance of the inductance 44). Assuming that the inductive reactance of the load is much greater than its ohmic resistance, the leakage-inductance voltage drop (vector IX in FIGURE 3b) will essentially be in phase with the voltage drop (vector V) across the load. With such an arrangement, any change in voltage drop across the leakage inductance 28 will produce an equal and opposite change in output voltage across the load. Thus, movement of the flux-barrier 30 towards the ends of the air-gap 20 will tend to increase the output voltage, relative to the induced secondary voltage E, substantially more than when a pure resistive load (FIGURE 2a) is used. Accordingly, an inductive load is capable of correcting more severe deviations from linearity than a resistive load. It will also be apparent that in some applications it will be desirable to employ a load having substantial components of both inductance and resistance, e.g. where the deviations from linearity in the induced voltage E are only moderately large.

It also is desirable in some applications to employ a load in which the ratio of load inductance (44) to load resistance (46) is equal to the ratio of the "mean" leakage inductance (38) to secondary winding resistance (40). ("Mean" leakage inductance is that value of leakage inductance which is mid-way between the maximum and minimum values; leakage inductance is maximum when the flux-barrier 30 is in the center of the air-gap 20, and minimum when the flux-barrier is at either end of the air-gap.) Such an arrangement minimizes changes in output voltage due to changes in frequency of the alternating-current supply feeding the primary winding 22. That is, when the leakage inductance is at its mean value, any change in leakage reactance due to a variation in supply frequency will be matched by a corresponding and proportionate change in load reactance; hence the secondary circuit and load impedances comprises, in effect, a frequency-insensitive voltage-dividing network. When the leakage inductance is not at its mean value, the output voltage across the load will, of course, be affected somewhat by variations in supply frequency, but such output fluctuations are minimized by the arrangement described.

In certain special situations, it may be desirable to produce a reverse compensation, i.e. a corrective effect which tends to reduce the output voltage as the flux-barrier moves towards the ends of the air-gap. This can be accomplished by employing a capacitive load 48 as shown in FIGURE 2c. With such an arrangement, the voltage drop across the load (vector V in FIGURE 3c) will be approximately 180° out of phase with the voltage drop (IX) across the leakage inductance 38. Accordingly, as the flux-barrier moves towards the ends of the air-gap there will be a decrease in the leakage inductance voltage drop relative to the induced secondary voltage E, and this in turn will produce a corresponding decrease in the output voltage V relative to the induced voltage.

Since the impedance of the leakage inductance 38 is directly proportional to the frequency of the energizing supply for the primary winding 22, the amount of corrective compensation for non-linearity provided by changes in leakage inductance will be affected by the supply frequency, i.e. the higher the frequency, the greater will be the compensation effect. It has been found, for example, that proper compensation can be obtained best by energizing the primary winding at frequencies higher than 60 cycles per second, e.g. 1000 cycles, particularly when the load is a pure resistance (as in FIGURE 2a). Also, it is especially desirable that the load have a relatively low impedance so as to assure that the voltage drop across the leakage inductance is sufficiently large to provide adequate compensation when the voltage drop changes due to shifting of the flux-barrier across the air-gap. It will be apparent, of course, that if the secondary windings 24 and 26 are connected to a very high-impedance load, such as a vacuum-tube voltmeter having an input impedance of many megohms, there will be no effective compensation because the voltage drop across the leakage inductance will be negligible. In such an arrangement, the voltmeter output will indicate the uncompensated non-linear relationship between the induced secondary voltage E and the positioning of the flux-barrier.

Although several preferred embodiments of the present invention have been set forth in detail, it is desired to emphazie that these are not intended to be exhaustive or necessarily limitative; on the contrary, the showings herein are for the purpose of illustrating the invention and thus to enable others skilled in the art to adapt the invention in such ways as meet the requirements of particular applications, it being understood that various modifications may be made without departing from the scope of the invention as limited by the prior art.

We claim:

In apparatus for measuring physical displacement, the combination including a structure of magnetic material having first and second magnetic circuits and a third magnetic circuit common to said first and second circuits, said magnetic structure being arranged to form air-gap means coupling said third circuit to said first and second circuits, a non-magnetic flux-barrier positioned to extend into said air-gap means, primary winding means coupled to said structure to produce flux in said two magnetic circuits, secondary winding means coupled to said first and second circuits to produce an output voltage in accordance with the relative division of flux in said circuits, the division of flux between said first and second circuits being determined by the positioning of said flux-barrier within said air-gap means so that the net voltage induced in said secondary winding means is a measure of the position thereof, said magnetic material establishing a leakage flux path which crosses said air-gap on both sides of said flux-barrier so that the magnitude of leakage inductance varies with the positioning of said barrier, an electrical load connected to said secondary winding means to be energized by the output voltage thereof and comprising both reactive and resistive components, the ratio of reactance to resistance of said electrical load being equal to the ratio of the mean value of leakage reactance to the winding resistance of said secondary winding means, said leakage inductance serving to produce an internal voltage drop between the induced secondary voltage and the output voltage fed to said load, the rate-of-change of the effect of variations in leakage inductance on said output voltage being equal to the rate-of-change of the effect of variations in air-gap flux density on the induced secondary voltage, as said flux-barrier is shifted from end-to-end through said air-gap means, whereby said output voltage is precisely linearly related to the positioning of said flux-barrier throughout the full range of movement thereof.

References Cited in the file of this patent
UNITED STATES PATENTS

| | | |
|---|---|---|
| 2,196,809 | Hoadley | Apr. 9, 1940 |
| 2,631,272 | Smith | Mar. 10, 1953 |